United States Patent [19]

Peteri et al.

[11] Patent Number: 5,343,552
[45] Date of Patent: Aug. 30, 1994

[54] DEVICE AND METHOD FOR BOILING WATER

[76] Inventors: Henri B. Peteri, Rozenburglaan 31, 3062 EB Rotterdam; Niels T. Peteri, Essenburgsingel 44b, 3021 AR Rotterdam, both of Netherlands

[21] Appl. No.: 731,453

[22] Filed: Jul. 17, 1991

[30] Foreign Application Priority Data

Jul. 18, 1990 [NL] Netherlands ............. 9001631

[51] Int. Cl.⁵ ............. F24D 17/00; F24H 1/20
[52] U.S. Cl. ............................................. 392/451
[58] Field of Search .............. 392/451, 452, 447, 449; 222/146.1, 146.5, 399, 405, 526, 527

[56] References Cited

U.S. PATENT DOCUMENTS

| | | | |
|---|---|---|---|
| 1,679,104 | 7/1928 | Trautman | 222/209 |
| 1,988,979 | 1/1935 | Campbell | 222/399 |
| 2,057,800 | 10/1936 | Strelow | 222/399 |
| 2,115,601 | 4/1938 | Whitby | 392/451 |
| 2,903,551 | 9/1959 | Fischer | 222/146.5 |
| 3,104,306 | 9/1963 | Markley | 392/451 |
| 3,202,321 | 8/1965 | Homeyer | 392/451 |
| 3,381,110 | 4/1968 | Fischer | 392/451 |
| 3,521,790 | 7/1970 | Freise et al. | |
| 3,581,057 | 5/1971 | Meyers | |
| 3,642,176 | 2/1972 | Dreibelbis | 222/146.1 |
| 3,873,808 | 3/1975 | Patton | 392/451 |
| 4,005,804 | 2/1977 | Dreibelbis | 222/146.1 |
| 4,007,674 | 2/1977 | Lichowsky | 392/444 |
| 4,174,053 | 11/1979 | Shimizu | 222/209 |
| 4,213,544 | 7/1980 | Pandolfi | |
| 5,019,690 | 5/1991 | Knepler | 392/449 |
| 5,076,467 | 12/1991 | Sugo | 222/146.5 |

FOREIGN PATENT DOCUMENTS

| | | |
|---|---|---|
| 969589 | 6/1975 | Canada . |
| 1482199 | 5/1967 | France . |
| 2152186 | 4/1973 | France . |
| 172589 | 4/1983 | Netherlands . |

OTHER PUBLICATIONS

Quooker Brochure, undated.

*Primary Examiner*—Teresa J. Walberg
*Attorney, Agent, or Firm*—Michael N. Meller

[57] ABSTRACT

A device suitable for supplying boiling water, having a thermally insulated compression resistant water reservoir, an electric heating element of such power that the water present in the reservoir is heated to a temperature above its atmospheric boiling point, a temperature control, with which the temperature of the water in the reservoir is adjusted above the boiling temperature under atmospheric pressure, a water inlet circuit which is connected to the water mains and which is suitable for supplying an inlet flow which is at least equal to the delivery flow of the device, as well as a discharge conduit for boiling water joined directly to the reservoir and connected to the top part thereof, the water inlet circuit terminating under or at the underside of the heating element, such a discharge valve is mounted directly on the reservoir or at a point in the discharge conduit as close as possible to the discharge opening in the reservoir.

17 Claims, 4 Drawing Sheets

DEVICE AND METHOD FOR BOILING WATER

BACKGROUND OF THE INVENTION

The invention relates to a device for supplying boiling water.

The prior art in the field of hot water supplying devices is fairly extensive. The prior art comprises, on the one hand, the devices which dispense hot water and, on the other, the devices which are designed for supplying boiling water.

The first group of devices includes the well known household boilers, which are so constructed that the water present therein can never reach the temperature of the atmospheric boiling point, Which is accomplished in particular by means of a thermostat ensuring that a water temperature of, for instance, 85° C., is not exceeded, and in any case, that the boiling temperature of the water is not reached. The water in these boilers is present therein under normal water mains pressure and the boiler, as well as the water outlet conduits connected thereto, are completely filled with water, so that the outflow of the water, too, occurs under water mains pressure and upon withdrawal of water invariably an initial flow of water is obtained whose temperature is lower than that of the water in the boiler. The pressure increase to be expected during the heating of the water in the boiler to a temperature close to its boiling point, the relatively large quantity of water present in household boilers, as well as the substantial scale formation to be expected at temperatures close to the boiling point, are reasons why achieving temperatures in the neighbourhood of the boiling point of water under atmospheric pressure is carefully avoided in devices as described hereinabove.

For many domestic purposes, for instance for making small quantities of coffee or tea, or for preparing small quantities of food, but also in laboratories, etc., it is desirable that small quantities of boiling water can be made available directly. It is noted here that there are important physical differences between boiling water on the one hand and heated, but not boiling, water, on the other, inter alia because boiling or thoroughly boiled water contains practically no carbon dioxide.

There are known so-called through-flow devices, which operate without pressure, i.e. the pressure on the water to be heated is the atmospheric pressure and the water is not heated to the temperature of the atmospheric boiling point until water is drawn off.

Known also are boiling-water devices, in which the water is maintained at a superatmospheric temperature in a reservoir and in which a thermostat is set at a value which is above the boiling point of water under atmospheric pressure. In these known boiling-water devices, the proposed, often complicated, construction was dictated by the fear that the pressure in the device would rise too high or that the cold and hot water would mix. The development of the prior art concerned is described in a series of four patent specifications.

Thus, GB patent specification 706,866 discloses a boiling-water device of the type described hereinabove, in which a limited water inlet is provided for, so as to allow the cold incoming water to be heated to the desired temperature before it comes into contact with the rest of the water. In this type of device, the incoming amount of cold water is kept so small that it can be heated to the reservoir temperature while it flows along the heating element and then leaves the reservoir through the outlet arranged adjacent the bottom. The hot water supply in the reservoir is drawn upon as soon as per unit time more water is being withdrawn than is flowing in through the limited inlet. In that case the outflow pressure is determined by the vapour pressure of the water in the boiler and this is relatively low and not constant. To make maximum use of the reservoir contents, it is required that the outlet conduit is connected at the lowest possible point in the reservoir. Further, in devices of this type the water inlet must be limited severely, in view of the high specific heat of water and the relatively large amount of energy which is required for heating a given quantity of water to above its boiling point under atmospheric pressure.

In U.S. Pat. No. 2,786,126 the development as described in GB patent specification 706,866 is carried on, but now a particular control valve is used in the inlet circuit, so the incoming water cannot cool the water stored below the desired temperature. It is striking, but understandable in view of the object contemplated, that both the water inlet and the water outlet terminate in the direct vicinity of the heating element.

U.S. Pat. No. 2,852,656 discloses a device in which there is no limited water inlet and in which means for drawing off boiling water are connected to the top part of the reservoir, i.e. not in the direct vicinity of the heating element. However, it appears from the disclosure in that patent specification, that again all precautions have been taken to pass the incoming water directly along the heating element, so as to adjust it to the temperature of the water already present in the reservoir as fast as possible, so as to prevent cooling of the water already present by the incoming water.

Finally, in U.S. Pat. No. 2,894,109 again mention is made of the fear that incoming cold water will cool the water present in the reservoir, but this time again recourse is taken to the use of a limited water inlet circuit, accomplished by means of a specially designed control valve, while the water inlet and the water outlet are again so arranged that they terminate in the direct vicinity of the heating element.

The devices described hereinabove have never gained practical application, presumably owing to their complicated construction and the associated problems encountered during use.

The invention as described in Netherlands patent specification 172,589 was based on the finding that the problem of incoming water cooling the reservoir contents does not arise in practice, and that without particular steps being taken, a good separation of cold and hot water remains present.

The device as described in that patent specification is of the type as described in U.S. Pat. No. 2,852,656. It comprises a thermally insulated compression resistant water reservoir, an electric heating element of such power that the water present in the reservoir is heated to above its atmospheric boiling point, a temperature control with which the temperature of the water in the reservoir is set above its boiling temperature under atmospheric pressure, a water inlet circuit, which is connected to the water mains and which is suitable for supplying an inlet flow which is at least equal to the delivery flow of the device, as well as means for drawing off boiling water joined directly to the reservoir and connected to the top part thereof.

In that device the water inlet circuit terminates under or at the underside of the heating element, while, preferably, there is arranged in the reservoir adjacent the water inlet a water divider for the incoming water to prevent the mixing of incoming cold water and the hot water present.

As described in that patent specification, in that device the cold/hot separation is maintained so well that more than 80% of the water contents can be withdrawn from the reservoir without the temperature thereof falling below the boiling temperature under atmospheric pressure. In the patent specification it is observed that this is surprising, the more so because the device described is intended for domestic use in particular, and accordingly is relatively small, having particularly a volume of less than 10 liters, more particularly of approximately 5 liters, so that precisely in such a device a high degree of mixing could be expected.

Although the device as described in Netherlands patent specification 172,589 has proved its merits in practice, its use is accompanied by a number of as yet unsolved problems, so that it has not become generally used.

One of these problems is that the discharge conduit for the boiling water must be kept as short as possible, so as to limit an initial flow of cold, at least not boiling, water as much as possible. In practice, this causes problems, because then the discharge orifice is not disposed sufficiently high above a working surface, for instance a sink or the like, leaving too little space to place a mug, a pot or the like, under the discharge orifice. Moreover, the necessity of a short discharge conduit requires that the device be arranged directly under the sink top or the like. In practice, this is not always possible.

In the known device, the discharge valve is arranged at the end of the discharge conduit, so as to prevent the egressing water drops in the discharge conduit from being accelerated too strongly by the expanding, 20-fold volume amount of steam. Moreover, as described, this discharge valve must be of a particular construction to prevent the water spurting from the outlet orifice like a spray.

In practice, this position of the discharge valve leads to two important disadvantages. Because the entire device. i.e. up to the discharge valve, is filled with water, the use of this device inevitably involves some initial flow of cold water. In view of the fact that the device is used for supplying small quantities of boiling water, for instance for making a single cup of tea or coffeee, any initial flow of cold water is altogether unacceptable to the user. Moreover, the tap arranged at the end of the discharge conduit will inevitably exhibit a measure of dripping.

It is an object of the present invention to provide a solution to the problems outlined hereinabove.

SUMMARY OF THE INVENTION

In the device according to the invention, which is otherwise of the type as described in Netherlands patent specification 172,589, the discharge valve is arranged directly on the reservoir or at a point in the discharge conduit that is as close as possible to the discharge opening in the reservoir. Preferably, the discharge valve is arranged at a point in the conduit, which is lower than the outlet orifice and in particular in an conduit portion ascending from the discharge opening in the reservoir.

Surprisingly, it has been found that by virtue of this construction, after a certain amount of water has been drawn off, virtually no water remains behind in the discharge conduit downstream of the discharge valve, because the rapid temperature drop in that conduit portion causes complete or virtually complete condensation of the water/steam mixture present therein.

The invention thus enables the construction of a device in which the length and the shape of the discharge conduit can be freely chosen within certain limits, so that the device can not only be used more universally but also installed in such a space of limited accessibility as would not be suitable for installing a device according to the aforementioned Netherlands patent specification in view of the possible length of the discharge conduit.

Another important advantage associated with the device according to the invention is that there is no or virtually no initial flow of cold water. Also the problem of dripping of the discharge conduit has been obviated, it having been found in particular that when the outlet conduit comprises an ascending portion that terminates in a descending portion, dripping of the tap can be avoided altogether.

Further, in the device according to the invention, the pressure in the portion downstream of the discharge valve is atmospheric, at least substantially atmospheric, which allows greater constructional freedom than in the known device.

The inner surface of the discharge conduit in the device according to the invention is preferably provided with a thermally insulating material, for instance a plastics.

It is noted that in the literature the problem of the occurrence of an initial flow of cold water in hot water devices, as well as of dripping from the discharge valve, is known as such, and solutions to these problems have been proposed. Thus, French patent specification 1,482,199 discloses an—atmospheric—device for supplying hot, i.e. non-boiling, water, in which an expansion vessel communicating with the discharge conduit is arranged which is in heat contact with the reservoir contents. After a certain amount of hot water has been drawn off, the residual water in the discharge conduit is sucked into the expansion vessel. However, this does not involve the condensation of a water/steam mixture present in the conduit in question.

In U.S. Pat. No. 3,581,057 an—atmospheric—hot water device is described, in which an expansion chamber is provided and in which the discharge valve is arranged in the cold water pipe to the device. During drawing off, by a venturi action, from this expansion chamber water is sucked along by the water flowing into the reservoir, while at the top part of the chamber air enters. After shutting off the valve, by gravity the water returns from the discharge neck into the expansion chamber, so that dripping and cold initial flow are avoided.

In the boiling water reservoir according to the invention, the temperature in the reservoir is maintained above the temperature of the atmospheric boiling point of water. To that effect, a thermostat that is known per se can be employed, which is set above a temperature of the atmospheric boiling point and whose control range is such that the temperature in the reservoir cannot fall below the atmospheric boiling point. Thus, non-boiling water is kept in store at a temperature, such that, when drawn off, the discharged water nevertheless has a temperature of at least 100° C. The temperature is preferably set at a temperature between 100° and 120° C.

Because the overheated water will immediately start to boil when flowing out, drawing off water is accompanied by audible and visible steam production. The steam production, which can optionally be adjusted through the thermostat value, gives an indication of the water temperature. Thus, the user can dispose of boiling water at any desired moment, for instance for making a single quick cup of tea or coffee, without being disturbed by the noise that is invariably produced when water is kept boiling continuously. At a water mains pressure above 1.5 atmosphere, the thermostat is preferably set at a temperature of about 110° C.

Although in principle a non-return valve can be used in connecting the device to the water mains, this is not necessary considering the minor dimensions of the reservoir, whose volume is maximally 10 liters, and particularly 5 liters. With such minor dimensions, the boiler can be of robust construction, the price being kept low. Moreover, the advantage is that a minor use of electricity will suffice and that the device occupies little space.

Heretofore, in automatic devices for preparing hot drinks, for which steam of approximately 110° C. is required, superheaters have been used in the form the through-flow heaters discussed hereinabove, wherein, using comparatively heavy electric heating elements, water is pumped through a heating zone with a controllable flow. Apart from the fact that this invariably involves an initial flow of cold water, the electricity mains is loaded with heavy electric current surges, while, moreover, it is impossible to accomplish drip dosaging of hot water.

The device according to the invention my be fitted with known dosing means, for instance for use in vending machines. An alternative dosing possibility is to provide a dosing chamber, in heat contact with the reservoir, which chamber can be connected to the outlet conduit via a shut-off valve and to the reservoir via a second shut-off valve. By operating these two shut-off valves in time-related alternation, for instance electrically, a reliable drip-free dosage can be obtained.

In the device according to the invention, the discharge valve or shut-off can in principle be of any known construction and can be operated directly or, e.g., via a cable or a rod, or electrically. The valve my be fitted with a spring-biased valve member, so that in emergencies it serves as a safety means.

In general, in the device according to the invention, the outflow of water and steam is decelerated, preferably at the end of the discharge conduit. To that effect, there can be provided at the outflow orifice one or more perforated plates, one or more layers of wire mesh, one or more guiding partitions or a combination of these means. These means are so chosen that the total passage resistance is such that a sufficient delivery flow is ensured when the shut-off valve is fully opened.

BRIEF DESCRIPTION OF THE DRAWINGS

To further explain the invention, some embodiments of the boiling-water device will now be described, byway of example only, with reference to the accompanying drawings.

Figure 1:
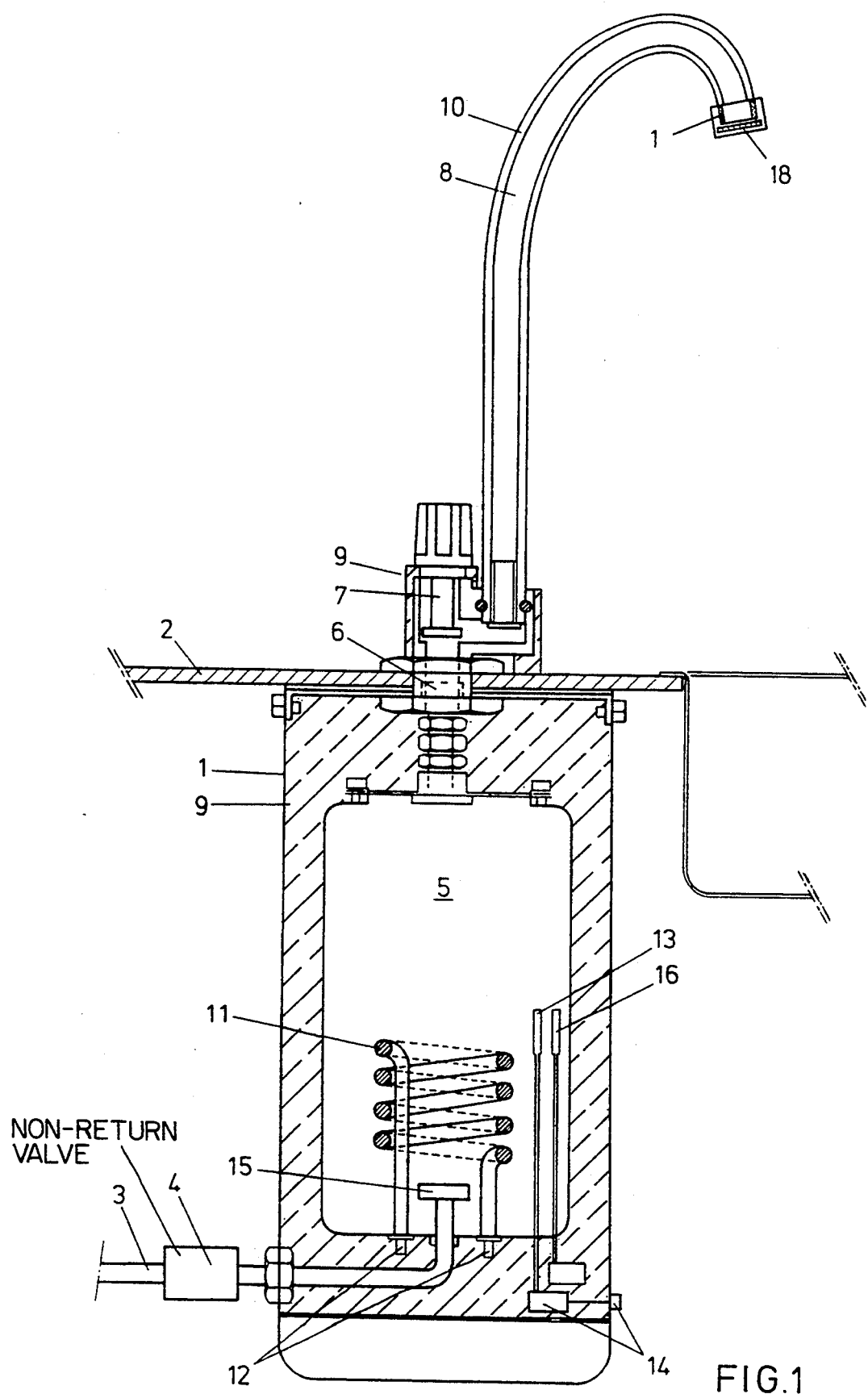
FIG. 1 shows a schematic axial section of the device 1, whose volume is smaller than 10 liters and in particular approximately 5 liters, arranged under a sink top 2 or the like and connected directly to the water mains 3, the valve 7, mounted at the top of the reservoir 5, being disposed above the sink top.

From the pipe 3, water is admitted to the reservoir compartment 5, optionally via a non-return valve with safety valve 4, compartment 5 being connected via a shortest possible conduit 6 to a discharge valve 7 and an, optionally pivotal, outlet 8. The reservoir 5 and the discharge means 6, 7 are preferably surrounded by an insulation 9, while the inner surface of outlet 8 is preferably likewise provided with an insulating material 10.

Extending in the reservoir 5 is an electric heating element 11 with connections 12. Further, a thermostat 13 with a switch 14 is arranged. Optionally, the switch 14 can be set at a desired temperature from outside.

The water in reservoir 5 is under the same pressure as prevails in pipe 3, for instance 1.5–3 atmosphere, which means that the water will only start to boil at a temperature between about 130° C. and 155° C.

If the thermostat 13 is set at a temperature of 110° C. with the switch 14, at normal water mains pressures the water will not boil and only upon opening of the valve 7 will it flow out under flash-evaporation, which is both audible and visible. The absence of steam is an immediate indication that the temperature of the water is too low. The rapid release of steam has the advantage that both carbon dioxide and obtrusive flavouring disappear from the water. Because the water, though having a temperature in excess of 100° C., does not boil, harmful deposition of scale will be restricted to a minimum.

According to a preferred embodiment of the device, a water divider 15 is arranged adjacent the bottom of the reservoir, generally adjacent the inlet of fresh water. A non-self-resetting temperature safety 16 can be arranged to prevent the temperature in the reservoir from rising too high if the thermostat fails. By means of threaded wire 17 or, for instance, a bayonet connection, and optionally using adapters, accessories can be connected to the boiling water device instead of, or in combination with, the decelerating means in the outlet orifice 18.

Figure 2:
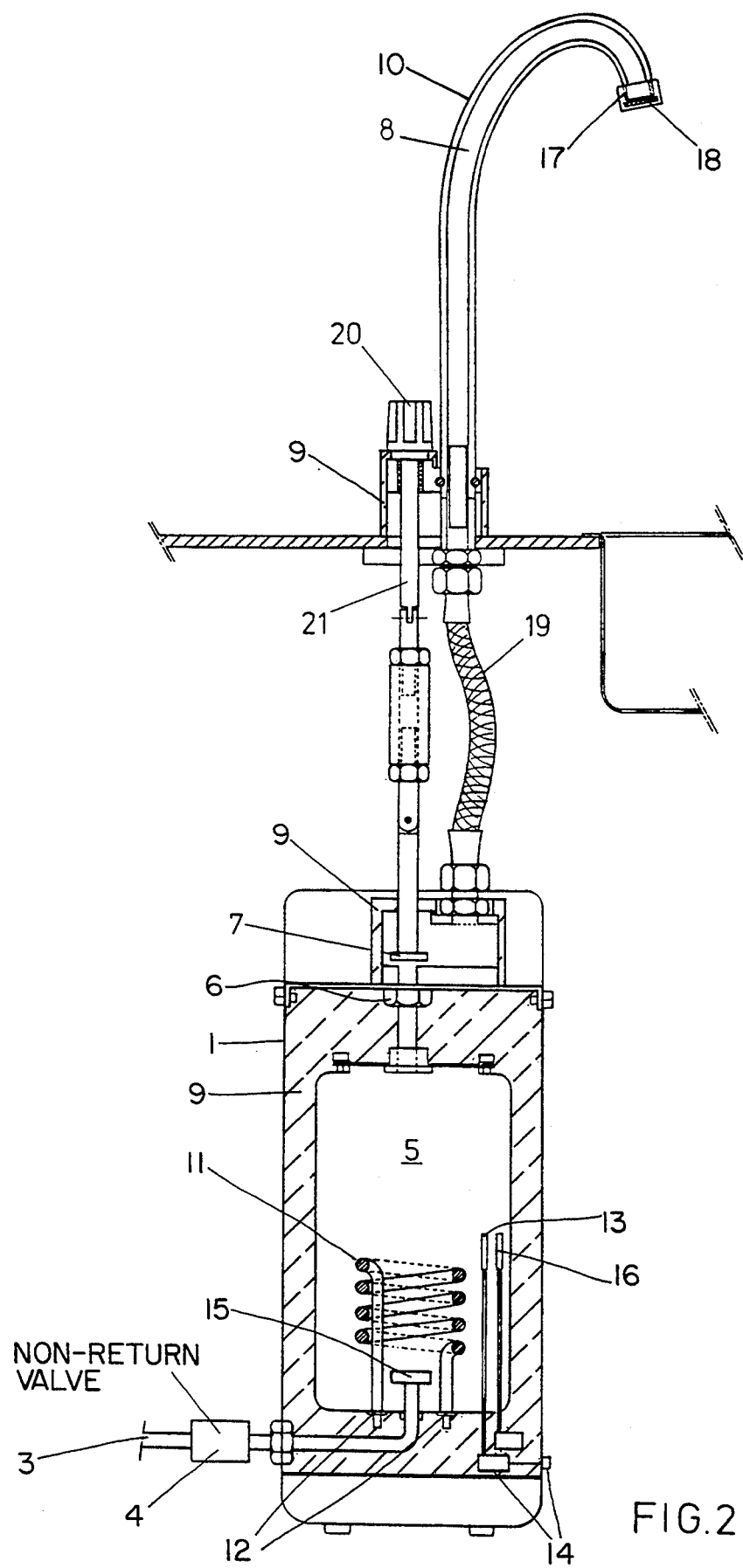

FIG. 2 is a section of the device with the reservoir 5 having the valve 7 mounted thereon, installed in a sink cupboard or a similar space and the outlet 8 being connected to the valve, for instance by means of a hose 19, while the valve is operated via a rod 21 by means of a turning knob 20 arranged above the sink top or the like.

Figure 3:
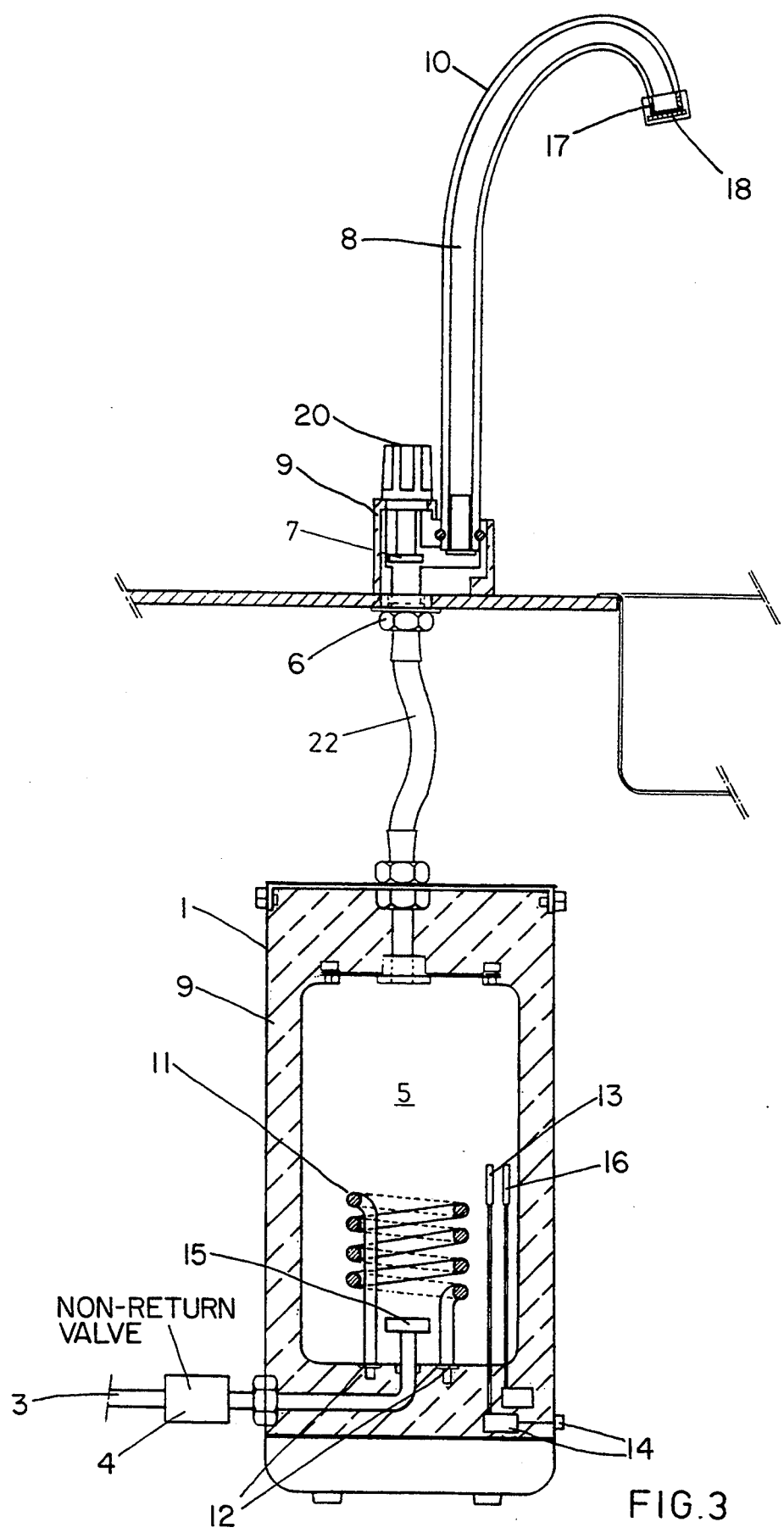

FIG. 3 is a section of the device in which the valve is arranged above the sink top and connected to the reservoir 5 via an insulated conduit 22.

Figure 4:
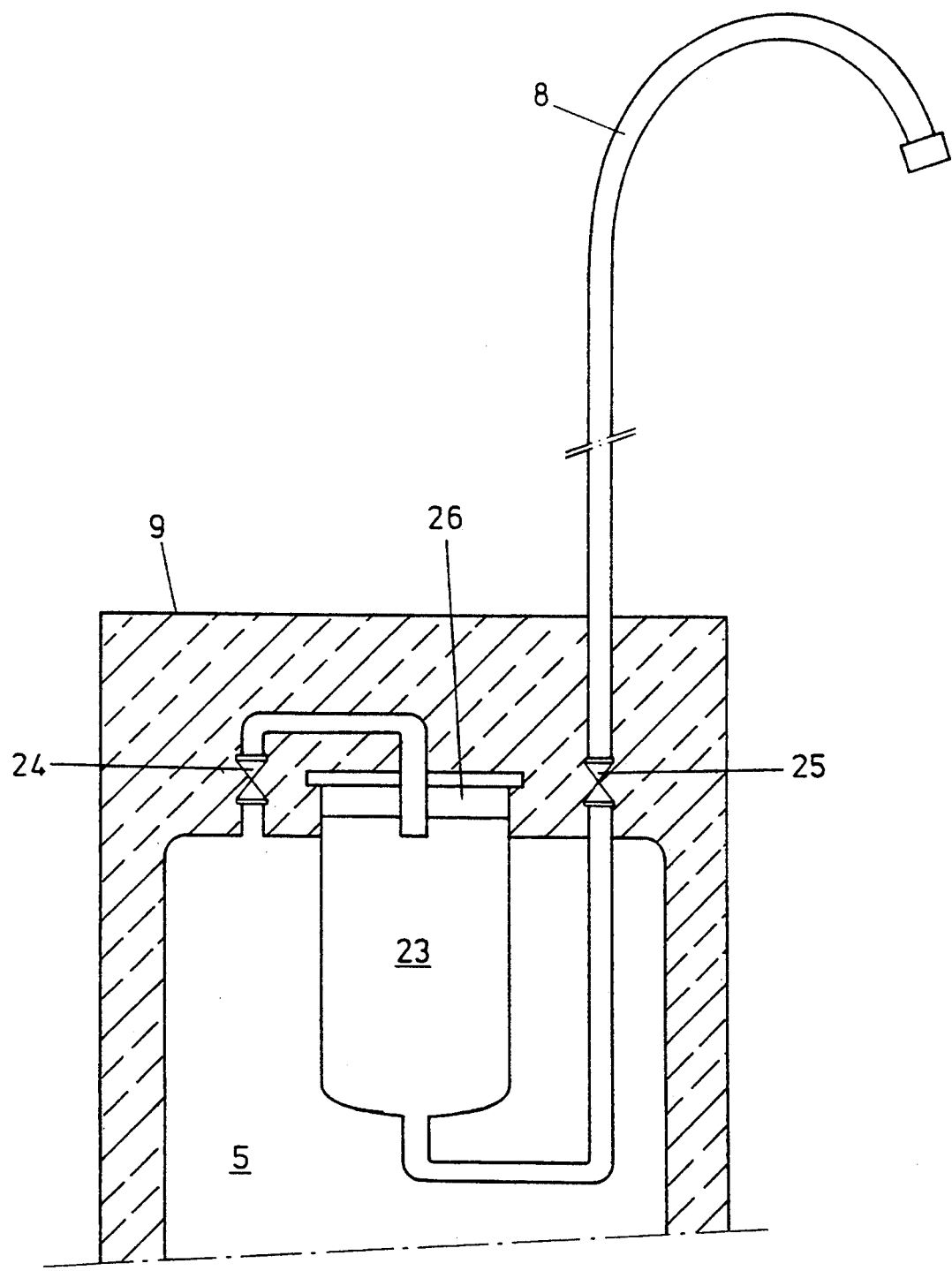

FIG. 4 is a schematic section of a dose-measuring device with a dosing chamber 23 arranged in the top of the reservoir 5 with an inlet valve 24 and an outlet valve 25, respectively connected to the reservoir and the outlet 8. Arranged on top of the dosing chamber 23 is a cover 26 permitting the proper dosage volume to be adjusted by means of filling bodies.

We claim:

1. A device suitable for supplying boiling water, comprising:
 a thermally insulated compression resistant water reservoir,
 an electric heating element located in said reservoir and of such power that the water present is heated to a temperature above its atmospheric boiling point,
 a temperature control, with which the temperature of the water is adjusted to a temperature which would be above the boiling temperature under atmospheric pressure,
 a water inlet which is connected to the water mains and which supplies an inlet flow to said reservoir which is at least equal to a maximum delivery flow of the device, and a discharge conduit for boiling water which is joined directly to the reservoir and connected to a top thereof, the water inlet terminating under an underside of the heating element, wherein a discharge valve is mounted at a point in the discharge conduit between an outlet orifice and a discharge opening in the reservoir and wherein there is arranged adjacent to the outlet orifice, means for decelerating the outflow of water and steam;

said water being heated to a temperature above its atmospheric boiling point substantially eliminates remaining water and steam in said discharge conduit following said discharge valve when said discharge valve is closed.

2. A device according to claim 1, wherein the discharge conduit is U-shaped, while the discharge valve is arranged in the ascending conduit portion, viewed from the discharge opening in the device.

3. A device according to claim 2, wherein the internal surface of the discharge conduit is provided with an insulating material.

4. A device according to claim 1, wherein the internal surface of the discharge conduit is provided with an insulating material.

5. A device according to claim 1, wherein there is arranged in the reservoir adjacent the water inlet a dividing plate for the incoming water.

6. A device according to claim 1, wherein said means are formed by at least one perforated plate, at least one layer of wire mesh, and at least one guiding partition.

7. A device according to claim 6, wherein said means are arranged so as to permit water and steam to flow from discharge valve to said outlet orifice while limiting the spray of steam and water from said orifice.

8. A device according to claim 1, wherein the reservoir volume is less than about 10 liters.

9. A device according to claim 1, wherein as a discharge valve, a dose-measuring mechanism is used.

10. A device according to claim 9, wherein the dose-measuring device comprises a dosing chamber in heat contact with the reservoir.

11. A device according to claim 10, wherein the dosing chamber can be connected to the top of the reservoir via a shut-off valve, while via a second shut-off valve the discharge outlet can be made to communicate with the underside of the dosing chamber.

12. A device according to claim 1, wherein the reservoir volume is less than about 5 liters.

13. A device according to claim 1, wherein the discharge valve is arranged in the discharge conduit at a point that is lower than the outlet orifice of the discharge conduit.

14. A device according to claim 13, wherein the discharge conduit is U-shaped, while the discharge valve is arranged in the ascending conduit portion, viewed from the discharge opening in the device.

15. A method for supplying boiling water, comprising:

inputting water from water mains into a thermally insulated compression resistant water reservoir, heating said water present in the reservoir to a temperature above its atmospheric boiling point, terminating a water inlet at a underside source of the heating, discharging said boiling water into a conduit via a discharge valve directly mounted at a point in the discharge conduit between an outlet orifice and the opening in the reservoir, providing back pressure on boiling water in said conduit, decelerating the outflow of water and steam, eliminating remaining water and steam in said discharge conduit following said discharge valve when said discharge valve is closed and providing a smooth flow of boiling water when the discharge valve is open.

16. A device according to claim 1, wherein the discharge valve is mounted directly on the reservoir.

17. A device according to claim 15, wherein the discharge valve is mounted directly on the reservoir.

* * * * *